United States Patent

[11] 3,609,528

| | | |
|---|---|---|
| [72] | Inventor | Nathan R. Smith<br>Willingboro, N.J. |
| [21] | Appl. No. | 817,686 |
| [22] | Filed | Apr. 21, 1969 |
| [45] | Patented | Sept. 28, 1971 |
| [73] | Assignee | Computer Test Corporation |

[54] NOISE PULSE CANCELLATION SYSTEM FORMED BY A PAIR OF TRANSFORMERS
8 Claim, 8 Drawing Figs.

[52] U.S. Cl. ................................................. 324/34 R, 324/34 MC
[51] Int. Cl. ............................................................. G01r 33/12
[50] Field of Search ............................................ 324/34 MC, 34 R

[56] References Cited
UNITED STATES PATENTS
2,980,848  4/1961  Datt et al. ..................... 324/37

OTHER REFERENCES
Roberts et al., Core Tester Simplifies Ferro-Amplifier Design Electronics, Aug. 1, 1957; pp. 150– 153; (copy in 324– 334)

Primary Examiner—Rudolph V. Rolinec
Attorneys—Maleson, Kimmelman and Ratner and Allan Ratner ABSTRACT: In testing magnetic memory cores, a core is mounted on a split conductor probe and a current pulse is applied to an input of the probe and there is produced at an output thereof an output voltage pulse and a noise pulse. A cancellation transformer is connected so that the current pulse applied to the input produces a noise cancellation pulse at the output. The magnetizing inductance of the transformer is adjusted to change the timing and amplitude of the cancellation pulse to coincide in time and amplitude with the noise pulse.

INVENTOR
NATHAN R. SMITH

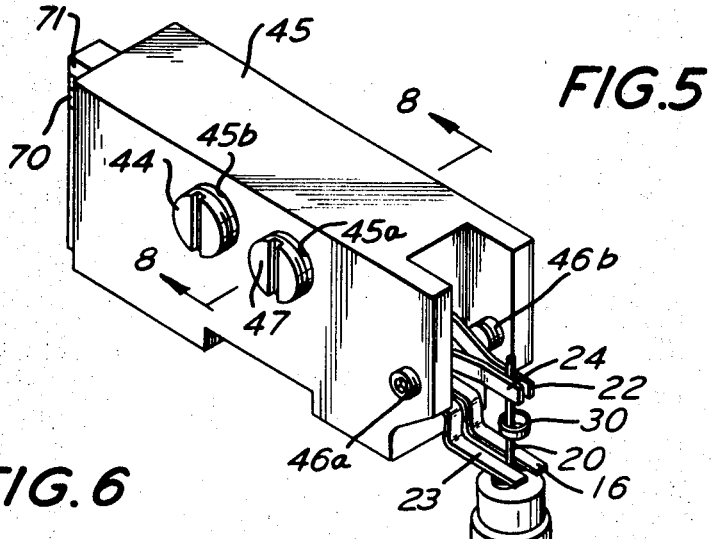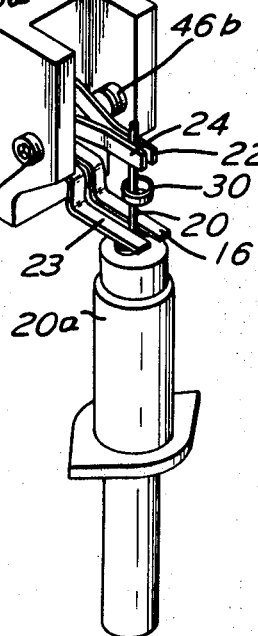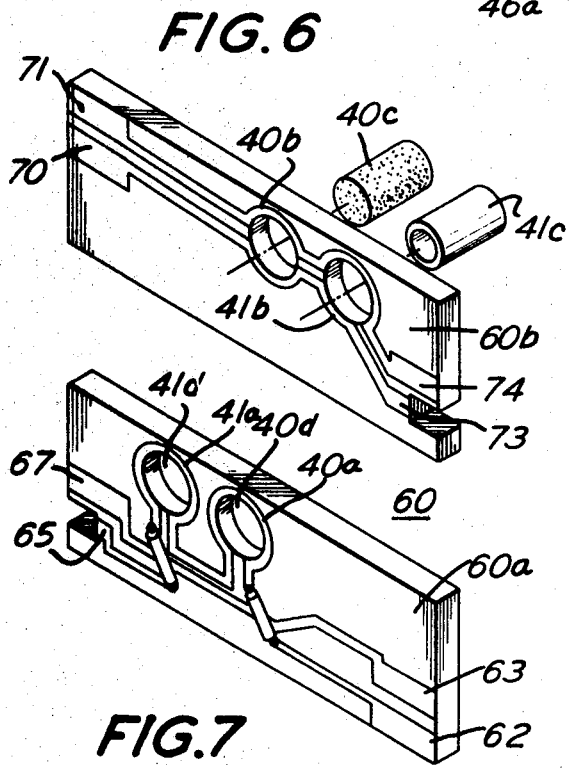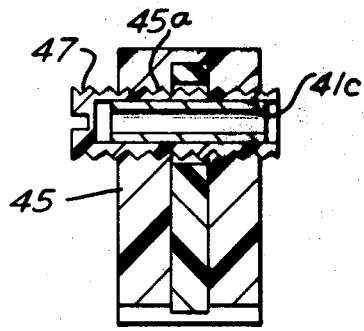

NOISE PULSE CANCELLATION SYSTEM FORMED BY A PAIR OF TRANSFORMERS

BACKGROUND OF THE INVENTION

1. Field of the Invention

This invention relates to the field of art of noise pulse cancellation in which the output voltage of a pulse transformer is variable in time and amplitude with respect to the input current.

2. Prior Art

Magnetic memory cores of the toroid type, for example, have been tested by mounting each core in turn on a split conductor probe. This type of core testing may be performed manually or automatically. A source of current pulses is applied to an upper removable contact engaging a first of the split conductors of the test probe and a lower contact engages the first split conductor to complete a path for current flow to ground. This path is defined as the drive circuit. Another pair of contacts engage a second one of the split conductors and is connected to a sense amplifier to define a sense circuit. In a test operation a fast rise time drive current pulse is applied to the first split conductor and by transformer action a resultant voltage pulse is sensed across the second split conductor. As a result of air flux pickup between the split conductors a substantial noise voltage pulse is generated in the sense circuit and applied to the sense amplifier.

In order to cancel this noise pulse it has been known to connect a noise cancellation transformer having its primary winding in the drive circuit and its secondary winding in the sense circuit. Accordingly, upon application of the drive current pulse a pulse is produced in the primary transformer winding which is coupled to the sense circuit to provide a cancellation pulse of opposite polarity to that of the noise pulse. The amplitude of the cancellation pulse is adjusted to be equal in amplitude to that of the noise pulse to tend to cancel the noise pulse.

However, complete cancellation of the noise pulse has not been achieved since I have found that the noise pulse is delayed in time with respect to the cancellation pulse. This delay in time is caused by the cancellation transformer and the test probe being physically separated by several inches, for example, in a typical test circuit. In addition, the hardware used to guide the test probe may be made of material such as carbide and "skin effects" result. The drive current pulse rise time may be as fast as 10 nanoseconds and at the beginning of this rapid rise of current, eddy currents flow in the carbide which tend to reduce the inductance of the test probe. Thus, at this time the inductance is of substantially small magnitude and the resultant voltage and noise pulses in the sense circuit are effectively equal to zero. At a later time in the rise time the magnetic lines of flux penetrate deeper into the carbide and as a result the inductance increases. Therefore the resultant sense circuit voltage and noise pulses begin to increase in magnitude. In this manner the noise pulse is delayed in time with respect to the drive current pulse. Since the drive current pulse generates the cancellation pulse and the cancellation pulse is not similarly delayed in time it will be understood that the cancellation pulse is earlier in time to that of the noise pulse. Accordingly the cancellation pulse is ineffective to completely cancel the noise pulse.

SUMMARY OF THE INVENTION

A noise pulse cancellation system for a device having applied to an input of the device a current pulse and having produced at an output of the device an output voltage pulse and a noise pulse. A noise pulse cancellation transformer has a primary circuit connected to the input of the device and a secondary circuit connected to the output of the device. Accordingly, the current pulse applied to the input produces a noise cancellation pulse at the output. The magnetizing inductance of the transformer is adjusted to change the timing and amplitude of the cancellation pulse to coincide in time and amplitude with the noise pulse.

BRIEF DESCRIPTION OF THE DRAWINGS

FIGS. 5–8 illustrate differing views of a mechanical detail of an assembly block which includes a cancellation transformer and other components of FIG. 4.

Referring now to FIG. 1 there is shown a test circuit for a magnetic memory core 30. The test circuit comprises a drive circuit 10, a sense circuit 11 and a core test probe 20 which are effective to test core 30 in accordance with ASTM C526–63T Tentative Methods of Test for Nonmetallic Magnetic Cores to be used in a Coincident Current Memory With a Two-to-One Selection Ratio Operating Under Full Switching Conditions.

Figure 1:
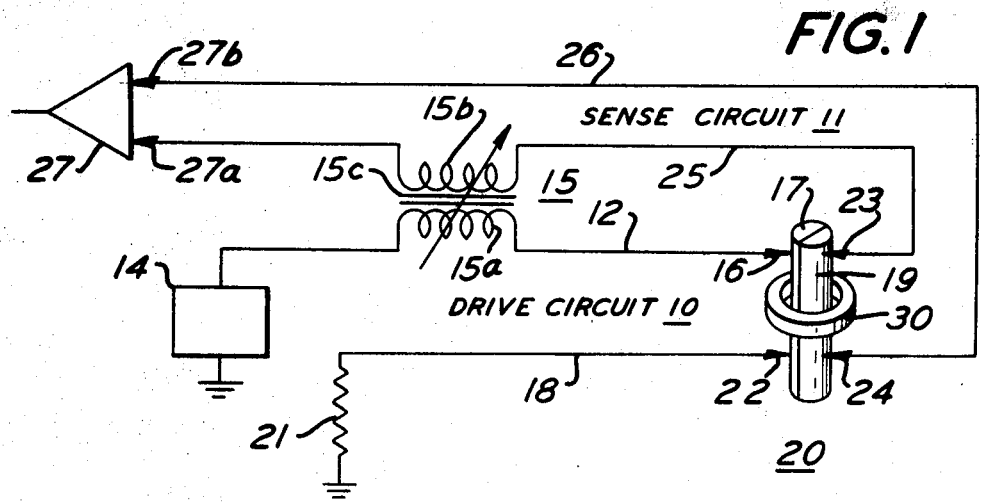
FIG. 1 illustrates in schematic diagram a conventional test circuit for a magnetic memory core.

In drive circuit 10 a source of current 14 provides a drive current pulse 14a which is applied by way of primary winding 15a of a noise cancellation transformer 15 and a conductor 12 to a first primary contact 16. Contact 16 engages one end of a first conductor 17 of split conductor probe 20 which comprises a pair of conductors 17 and 19 insulated from each other. Noise cancellation transformer includes a conventional powdered iron core 15c.

A second primary contact 22 engages the other end of conductor 17 and is connected by way of a conductor 18 and a substantially low value resistor 21 to ground. A first secondary contact 23 engages one end of second conductor 19 and is connected by way of secondary winding 15b of cancellation transformer 15 to one differential input 27a of a differential sense amplifier 27. A second secondary contact 24 engages the other end of second conductor 19 and is connected by way of conductor 26 directly to the other differential input 27b of sense amplifier 27. Contacts 22 and 24 may be removable contacts which may be removed from engagement with conductors 17 and 19 to allow an opening of a toroidal magnetic memory core 30 to receive the conductors and be disposed in a test position as best shown in FIG. 5.

Figure 3:
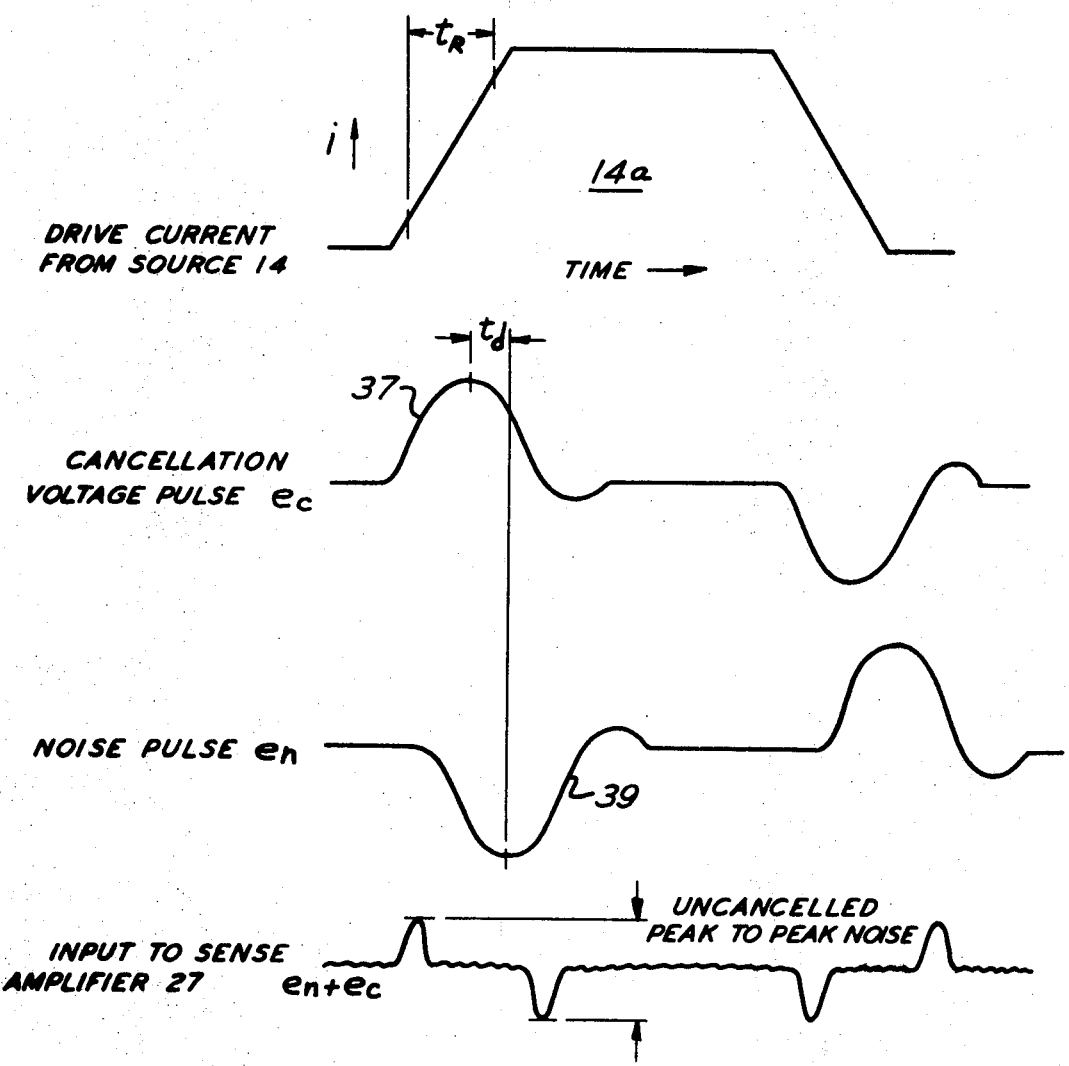
FIG. 3 illustrates waveforms helpful in understanding the test circuit of FIGS. 1 and 2.

In a test operation, current source 14 generates a drive current pulse 14a, FIG. 3, of substantially very fast rise time which flows through primary winding 15a, first conductor 17 and resistor 21 to ground. The rise time "$t_R$" of pulse 14a may be between 10 and 20 nanoseconds in typical tests. As a result there is generated by means of transformer action between conductors 17 and 19 a voltage pulse across second conductor 19 which is applied to differential sense amplifier 27.

Figure 2:
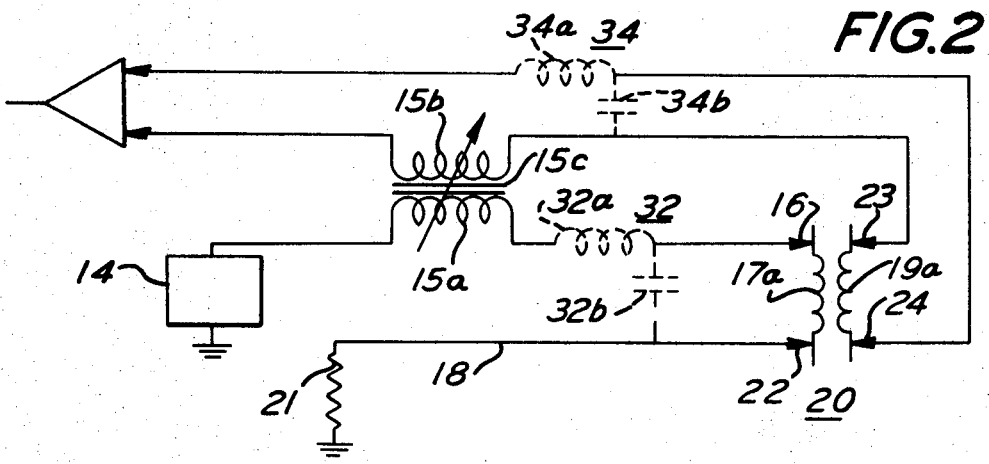
FIG. 2 illustrates in schematic diagram the test circuit of FIG. 1 in which circuit components have been replaced by their effective circuit elements.

In FIG. 2, test probe 20 of FIG. 1 has been replaced by its effective circuit elements in which first conductor 17 is shown as a primary winding 17a of a probe transformer and second conductor 19 is shown as a secondary winding 19a thereof. The physical electrical connection between primary winding 15a and primary winding 17a of test probe 20 may be considered to be a lumped transmission line 32. Similarly the electrical connection between secondary winding 15b and secondary winding 19a may be considered to be a lumped transmission line 34. Line 32 comprises inductance 32a ($L_D$) in series and capacitance 32b ($C_D$) in shunt in the drive circuit 10 and line 34 comprises inductance 34a ($L_S$) in series and capacitance 34b ($C_S$) in shunt in sense circuit 11. These series inductances and shunt capacitances at the operating rise times provide substantial time delays. In addition, as previously described, since the hardware used to guide the test probe may be made of material such as carbide, there is a substantially low value of inductance at the beginning of the rise time of current pulse 14a. Later in the rise time, there is an increase in the inductance as the flux penetrates into the hardware.

As shown in FIG. 3, drive current pulse 14a produces a cancellation voltage pulse 37 "$e_c$" at secondary 15b of transformer 15. Pulse 37 is prior in time by time duration "$t_d$" to a sense circuit noise pulse 39, "$e_n$" as a result of the time delays caused by the transmission line effects and the change in flux effects. The time delay between these two voltage pulses when added at the input of sense amplifier 27 produces an uncancelled peak to peak noise voltage $e_n + e_c$ as illustrated in FIG. 3. This uncancelled noise voltage results in appreciable error in the testing of the cores.

Figure 4:
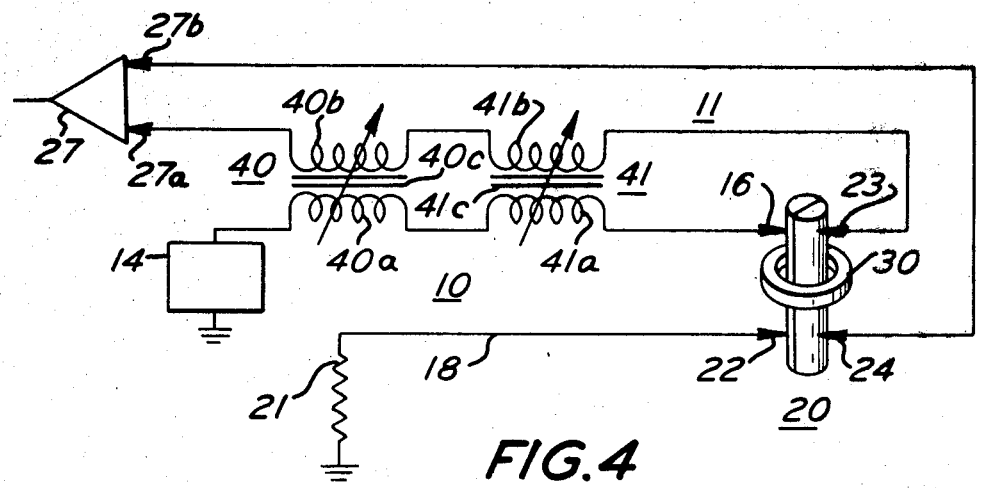
FIG. 4 illustrates in schematic diagram the test circuit of FIG. 1 having a cancellation transformer embodying the invention.

In order to change the timing of cancellation pulse 39 there is provided two cancellation transformers 40 and 41 as shown in FIG. 4 instead of the single cancellation transformer 15 of FIGS. 1 and 2. Similar circuit elements have been identified with corresponding reference characters. It will be understood that first cancellation transformer 40 is disposed very close to second cancellation transformer 41 so that they effectively operate as a single cancellation transformer. As in transformer 15 first transformer 40 also includes a powdered iron core 40c which may be encapsulated in a plastic threaded rod 44 which is threaded into an assembly block 45, FIGS. 5–8. On the other hand second transformer 41 includes a hollow cylindrical iron rod core 41c encapsulated in a plastic rod 47 which is threaded within assembly block 45. It will be understood that core 41c has a permeability of very high value as compared to core 40c. Both cores 40c and 41c may be adjusted to different positions by threading the cores within block 45 thereby to vary the coupling between each core and its respective primary winding 40a, 41a and its respective secondary winding 40b, 41b.

By varying the coupling of powdered iron core 40c the amplitude of correction pulse 39 may be varied in magnitude. By varying the coupling of cylindrical core 41c the following effect is produced. At the beginning of the rise time $t_R$ of drive current pulse 14a flux begins to flow through core 41c. As a result of this flow of flux, individual eddy currents are produced which add together to form a current flow in the core material. Since core 41c is not granulated or laminated but presents a minimum amount of electrical resistance, (substantially highly conductive) the eddy current flow is of substantially high value. As understood, this eddy current flow produces flux lines which flow through the center of core 41c in a direction to oppose the flux produced by primary winding 41a. In this manner the flow of flux is limited through the center of core 41c but is not so limited at the outer edge of the core which is defined as magnetic skin effect. These effects are described in a text by G. R. Slemon, Magnetoelectric Devices: Transducers, Transformers and Machines. John Wiley & Sons, 1966, p. 121 et. seq.

Accordingly this limitation in the flow of flux limits the effective inductance of transformer 41 so that the voltage output across secondary winding 41b is of substantially small magnitude during the initial part of the rise time of the current pulse.

During the latter portion of the rise time of the current pulse, the flux produced by primary winding 41a penetrates deeper into core 41c and therefore the effective inductance of the core increases. Accordingly at the latter part of the rise time the output voltage pulse across secondary winding 41b increases in magnitude. Since transformers 40 and 41 are adjacent to each other they effectively act as a single transformer to produce a single cancellation pulse which has been delayed in time by the eddy current effect of transformer 41. The time of cancellation pulse 37 may be varied by changing the coupling of core 41c and the amplitude of the correction pulse may be varied by changing the coupling of transformer 40 both in a manner to effect cancellation of noise pulse 39.

It will now be understood that a cancellation pulse 37 may be generated during the latter part of the rise time having a time duration just sufficient to cancel noise pulse 39. To provide such a time duration it is necessary that core 41c have a high-value permeability so that it saturates rapidly as the drive current increases. If such rapid saturation did not occur the flow of flux would continue to change thereby increasing the duration of cancellation pulse 37 beyond that necessary to cancel noise pulse 39.

The saturation point of core 41a may be reached more rapidly by the flux by limiting the total cross-sectional area of the core material. Core 41c may be cylindrical in shape as illustrated in FIGS. 6 and 8 with the cross section of the cylinder being at right angles to the direction of the flow or lines of flux. The core material may be iron or any magnetic material which would have eddy current loss to produce a desired shape of the resultant correction pulse 37. In order to change the pulse shape of pulse 37 any one or all of the parameters of the core may be changed as for example the wall thickness, the overall diameter of the core or the height of the core. In addition the core geometry may be changed as for example small rectangular sections of sheet metal may be used to form a rectangular solid with the ends of the solid at right angles to the lines of flux. Alternatively small diameter metal rods may be used each being longitudinal to the direction of the lines of flux. In another embodiment, a cylinder may be made of small diameter steel wire formed into torroids and stacked to a predetermined height.

In accordance with the invention the core configuration is selected so that there is an initial maximum eddy current flow and the core material saturates rapidly as the drive current increases to thereby terminate the pulse. In this manner cancellation transformers 40 and 41 provide a cancellation voltage pulse at a time and at an amplitude sufficient to cancel the effect of noise pulse 39. This can be expressed in mathematical terms in which the noise pulse $e_n$ is equal to a function of time as follows:

$$e_n = L_p(t) di/dt \qquad (1)$$

where
$L_p$ = magnetizing inductance of probe 20
$i$ = drive current

A cancellation pulse 37 is generated where it is desired that $$e_c = -e_n \qquad (2)$$

However, as previously described for the circuit of FIG. 1 $e_c + e_n$ is not equal to zero due to phase difference "$t_d$" in which $$t_d \simeq \sqrt{L_D C_D} + \sqrt{L_S C_S} + t_p - t_c \qquad (3)$$

where
$t_p$ = delay time across probe transformer 20 leakage inductance and interwinding capacitance
$t_c$ = delay time across cancellation transformer 15 leakage inductance and interwinding capacitance As previously described in accordance with the invention there is negligible actual separation between test probe 20 and cancellation transformers 40 and 41 in FIG. 4 and therefor the delay times of the lines connecting the probe and the transformer, $\sqrt{L_S C_S}$ and $\sqrt{L_S C_S}$ are effectively equal to zero. In addition cancellation transformers 40 and 41 combine to form a resultant cancellation transformer having a magnetizing inductance capable of varying the cancellation pulse in time and amplitude thereby to generate a cancellation pulse:

$$e_c = L_c(t) di/dt$$

where
$L_c$ = magnetizing inductance of transformers 40 and 41

In this manner a cancellation pulse may be produced which is equal to the noise pulse in accordance with equations 1 and 2 and thereby effect its cancellation.

As illustrated in FIGS. 5–8 the primary and secondary windings of transformers 40 and 41 are formed on a printed circuit board 60 which is molded within assembly block 45. Circuit board 60 comprises an upper face 60a having drive circuit 10 wiring and a lower face 60b have sense circuit 11 wiring. The drive circuit wiring on face 60a comprises a single loop of a conductive strip arranged adjacent to and around opening 40d which forms primary winding 40a. Another single loop is arranged adjacent to and around opening 41d to form primary winding 41a. One of the conductive strips on face 60a may be traced by way of a contact 62, counterclockwise around primary winding 40a and then counterclockwise around winding 41a and then to a contact 65. In addition a direct conductive strip connection is provided between contact 63 and contact 67. To provide the connections of FIG. 4, contact 62 is coupled to current source 14, contact 63 is coupled to resistor 21, contact 65 is coupled to contact 16 and contact 67 is coupled to contact 22.

On face 60b the sense circuit conductive strip comprises two half loops forming secondary winding 40b and two half loops forming secondary winding 41b. Specifically one of the conductive strips may be traced by way of a contact 70, around openings 40d and 41d and to a contact 73. The other conductive strip may be traced by way of a contact 71 around openings 40d and 41d to contact 74. Inputs 27a–b of sense amplifier 27 are connected to contacts 70 and 71 respectively and contacts 23 and 24 are connected to contacts 73 and 74 respectively.

In FIG. 5 probe 20 is illustrated having a plastic body 20a and a pair of conductive buttons which are connected to conductors 17 and 19 and engage contacts 16 and 23. Screws 46 a and 46b are effective to vary the tension on spring contacts 24 and 22 respectively. Encapsulated cores 40c and 41c pass through openings 40d and 41d respectively in board 60 and threadedly engage respective threaded openings 45a and 45b in block 45.

What is claimed is:

1. A system for testing magnetic memory cores in which a core is mounted on a split conductor probe and a current pulse is applied to an input of said probe and there is produced at an output thereof an output voltage pulse and a noise pulse comprising said split conductor probe having a first and a second conductor insulated from each other, cancellation transformer means comprising a first primary winding in series circuit with a second primary winding and a first secondary winding in series circuit with a second secondary winding, said first and second windings being disposed adjacent to each other and very close to said probe, means including a current source for providing a fast rise time drive current pulse for flow through said first and second primary windings and through said first conductor, sensing means connected in circuit with said first and second secondary windings and said second split conductor, a first core magnetically coupled to said first windings and movable with respect thereto to provide a desired amplitude cancellation pulse in said sensing circuit, and a second core magnetically coupled to said second windings and movable with respect thereto, said second core having (1) a permeability of substantially high magnitude as compared with said first core, (2) a high conductivity, (3) a maximum eddy current flow at the beginning of the rise time of said current pulse and (4) saturating rapidly as said current pulse increases thereby to provide a time variable single cancellation pulse in said sensing circuit.

2. A noise pulse cancellation system for a device having applied to an input of said device a current pulse and having produced at an output of said device an output voltage pulse and a noise pulse comprising cancellation transformer means having a primary circuit connected to said input and a secondary circuit connected to said output whereby said current pulse applied to said input produces said voltage pulse, said noise pulse and a single noise cancellation pulse in said output, said cancellation transformer means comprises a first and a second transformer, said first transformer having a first primary winding and a first secondary winding, said second transformer having a second primary winding and a second secondary winding, said first primary winding in series circuit with said second primary winding defining said primary circuit, said first secondary winding in series circuit with said second secondary winding defining said secondary circuit, said first transformer having a first core of magnetic material movable with respect to said first windings thereby to vary the magnetic coupling between said first core and said first windings and said second transformer having a second core of substantially highly conductive and highly magnetic material movable with respect to said second windings thereby to vary the magnetic coupling between said second core and said second windings, and said first transformer being very close to said second transformer to provide an effective single resultant transformer whereby the magnetizing inductance of said resultant transformer is adjusted by moving said cores thereby to change the timing and amplitude of said single cancellation pulse to coincide in time and amplitude with said noise pulse.

3. The noise pulse cancellation system of claim 2 in which said first primary winding is disposed very close to said second primary winding and said first secondary winding being disposed very close to said second secondary winding thereby providing negligible separation between said first and second primary windings and between said first and second secondary windings.

4. The noise pulse cancellation system of claim 3 in which said device includes a first and a second input terminal and a first and a second output terminal, said primary circuit being connected between said first input terminal and said device input and said secondary circuit being connected between said first output terminal and said device output.

5. The cancellation system of claim 2 in which said second core (1) has a permeability of substantially high magnitude as compared with said first core and (2) is formed having a maximum eddy current flow at the beginning of the rise time of said current pulse and saturating rapidly as said current pulse increases.

6. The cancellation system of claim 5 in which said second core is of hollow cylindrical shape having a cross section at right angles to the lines of flux produced by said second windings.

7. The cancellation system of claim 4 in which said first and second windings are disposed very close to said device whereby the electrical connections between said first and second windings and said device are substantially short thereby to decrease any delay times therebetween.

8. The cancellation system of claim 2 in which there is provided a single printed circuit board having a first opening for receiving said first core and a second opening for receiving said second core, at least one conductive strip on a first surface of said board being arranged adjacent to and around said openings to form said first and second primary windings, at least one conductive strip on a second surface of said board arranged adjacent to and around said first and second openings to form said first and second secondary windings.